UNITED STATES PATENT OFFICE.

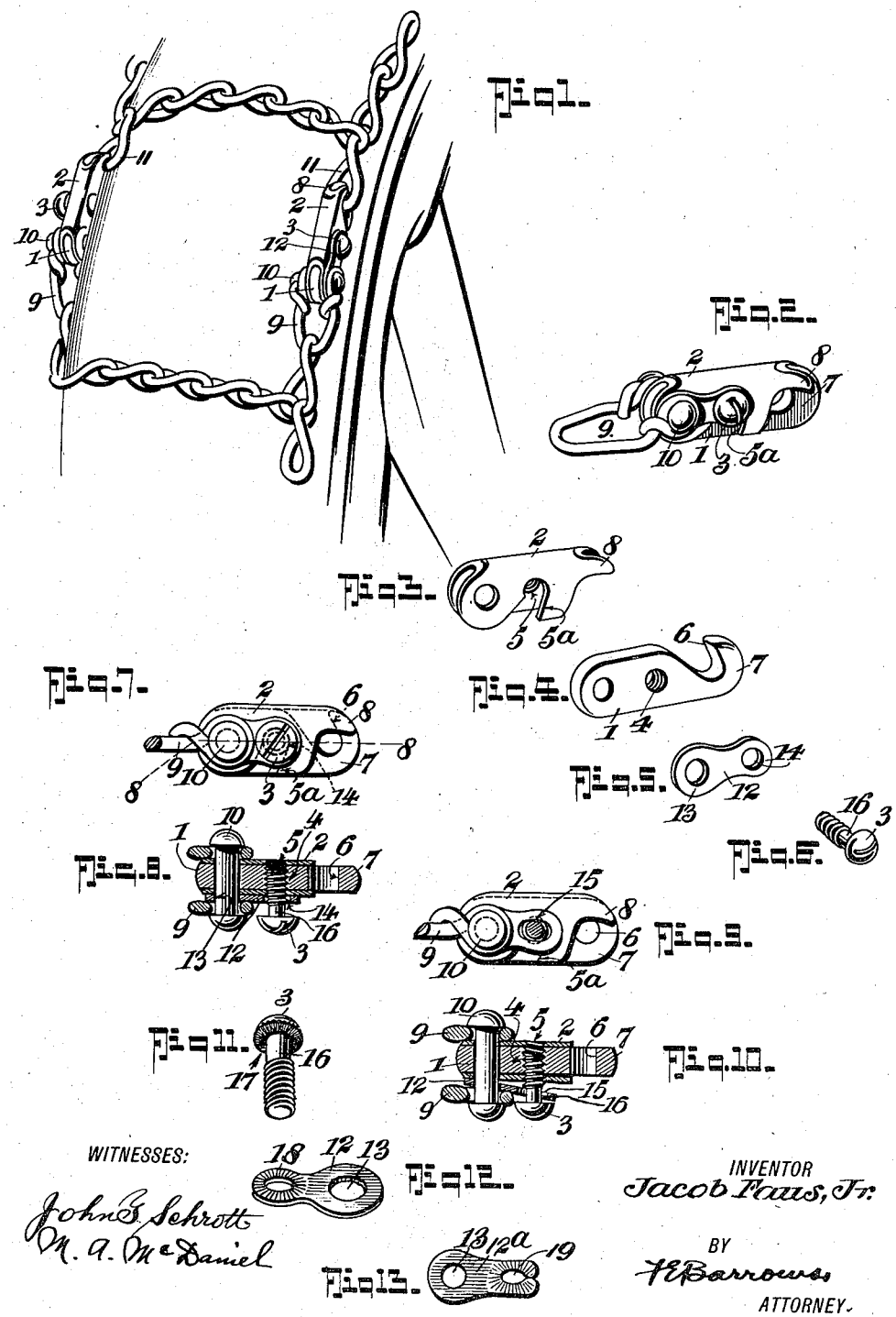

JACOB FAUS, JR., OF BOULDER, COLORADO.

SAFETY-FASTENER FOR AUTOMOBILE-CHAINS, &c.

1,136,786. Specification of Letters Patent. Patented Apr. 20, 1915.

Application filed October 6, 1914. Serial No. 865,360.

*To all whom it may concern:*

Be it known that I, JACOB FAUS, Jr., a citizen of the United States, residing at Boulder, in the county of Boulder and State of Colorado, have invented certain new and useful Improvements in Safety-Fasteners for Automobile-Chains, &c., of which the following is a specification.

The present invention relates to an improvement upon the fastener described and claimed in my application Serial No. 837,529 filed May 9, 1914. In said application I have described and claimed a fastener made up of an inner hook member having a hook recess near one end, an outer casing inclosing said hook member and closing the side of said recess, said hook member and casing being pivotally mounted near one end with respect to each other, and being provided with intermediate openings adapted to aline with each other, fastening means being provided for passing through said intermediate openings for fastening the casing and hook together.
In the preferred embodiment of the invention described and claimed in said application the fastener is a screw passing through threaded openings in the hook member and in the back side of the casing and through an open slot in the front side of the casing, so that the casing can be opened by withdrawing the screw from the threaded opening on the back side of the casing without entirely withdrawing the screw from the hook. It sometimes happens however that the screw becomes entirely removed and lost when the fastener is not in use.

It is one of the objects of the present invention to provide a simple and inexpensive safety fastener of the same general construction described in the preceding paragraph, but provided with means for preventing the complete removal of the screw fastener so that this fastener will not become lost, the parts of the fastener including the screw being kept together whether the fastener is in use or not.

Other objects of the invention will appear in connection with the more detailed description thereof.

In the accompanying drawings I have illustrated certain embodiments of my invention, and the invention will be more particularly described in connection therewith, it being intended and understood that the invention is illustrated by, but is not limited to, the embodiments thereof so illustrated.

In the accompanying drawings:—Figure 1 shows in perspective part of an automobile wheel with detachable chains thereon united by the safety fastener of the present invention. Fig. 2 shows in perspective the fastener itself. Figs. 3, 4, 5, and 6, show respectively the outer casing, the hook member, the safety plate, and the screw fastener, before these parts are assembled. Fig. 7 shows the fastener assembled before the screw has been prevented from removal by the safety plate. Fig. 8 shows a horizontal central section of the fastener on the line 8—8, Fig. 7. Fig. 9 shows the fastener in elevation with the screw head removed. Fig. 10 is a central horizontal section of the fastener shown in Fig. 9, the screw being partly withdrawn to show the operation of the safety fastener. Fig. 11 shows in perspective a modified form of screw; Fig. 12 shows in perspective a modified form of the safety plate; and Fig. 13 shows a further modification of the safety plate.

The fastener illustrated is made up of the inner hook member 1 and the outer casing 2 inclosing said hook member, said hook member and casing being adapted to be clamped together in closed position by a screw 3 extending through the central opening 4 in the hook member and the central hole 5 and slot 5ª in the casing. The hole 4 in the hook is threaded and the rear hole 5 in the casing is also advantageously threaded. The hook member is provided with a hook recess 6 inclosed by the main body portion and by the end hook portion 7. The casing is provided with a complementary cut away portion to enable a chain link to be held in the hook recess, and with projections 8 which close the sides of the hook recess and hold the chain link in place.

The hook member and recess are shown as pivoted upon a chain link which, in the case of an automobile chain, is the end link of the side chains. Such a link is shown at 9 attached by means of the rivet 10 passing through holes in the ends of the hook member and recess. The other end of the chain to which the fastener is attached is shown at 11 in Fig. 1.

In the operation of the hook member and recess as already described, and as described and claimed in my prior application Serial No. 837,529, the screw 3 is screwed into the holes 4 and 5 to hold the fastener in place. The fastener is opened by withdrawing the screw 3 from the opening 5, whereupon the fastener can be opened without withdrawing the screw from the hook member, the open-sided slot 5ª permitting the casing to be swung back. In order to prevent the screw from being entirely withdrawn and misplaced or lost when the fastener is not in use, or accidentally, an additional safety fastening plate 12 is provided, pivoted by means of the hole 13 upon the rivet 10, upon which the hook member and casing are also pivoted. This safety plate is provided with a further opening 14 which may advantageously be a round opening before the parts are assembled to permit the passage of the screw therethrough. The screw 3 has the threads cut away and its diameter reduced at 16 for a short distance near the head, and after the screw has been inserted the opening 14 is elongated and narrowed by hammering or by compression or otherwise, as shown at 15 in Figs. 9 and 10. The width of this opening is made less than the diameter of the threaded portion of the screw so that the screw cannot be withdrawn through it. As a result, when the screw is unscrewed, as illustrated in Fig. 10, the threaded portion of the screw engages with the safety plate and tends to spring it out as shown, removal of the screw however being prevented. Accordingly, when the fastener is hurriedly unfastened and detached as is frequently the case, loss of the screw is avoided, and no particular attention need be given to it. The fastener is however readily put together and fastened when desired merely by tightening the screw.

In order that the screw may be more effectively held in place when tightened, the under side of the head of the screw is advantageously roughened or fluted as shown at 17, Fig. 11, and the side of the plate 12 with which the under side of the head engages is similarly shown as roughened or fluted at 18 in Fig. 12. When these roughened surfaces engage with each other they more effectively lock the screw in place and prevent accidental unfastening. Moreover the casing 2 is advantageously made of sheet metal which is flexible and yieldable to a greater or less extent, and when the opening 5 in the back of the casing is threaded, and the screw is tightened, the casing is clamped against the hook member by the tightening of the screw and the screw is thereby more or less firmly locked in place, this action of the threaded openings and of the flexible casing being somewhat similar to the action of a nut lock formed by two nuts on the same bolt.

Instead of making the hole 4 in the safety plate 12 round and subsequently flattening the same upon the reduced portion 16 of the screw, the end of this safety plate may be slotted. Such a slotted plate is shown at 12ª in Fig. 13, the slot 19 being formed in any suitable manner, and the operation of this slot being the same as that of the elongated hole of the fastener shown in Figs. 9 and 10.

It will be understood from the above description that when once the fastener has been assembled and placed upon a chain link it can be opened and closed without detaching any parts completely from each other so that there are no loose or separable parts to be misplaced or to get lost. It is necessary merely to unscrew the screw to a small extent to permit the fastener to be opened and closed, and to tighten the screw to secure the fastener in closed position. It will be seen also that the screw when tightened is effectively locked and that when unfastened cannot be entirely removed and misplaced, the safety plate furnishing an effective means for preventing complete withdrawal of the screw while nevertheless permitting a sufficient partial withdrawal to enable easy opening and closing of the fastener when desired.

It will be seen that the fastener as a whole is of substantially the size and shape of an oval chain link, with the corners smoothly rounded and with no sharp angles and projections. The fastener can be made either in "rights" or "lefts", for use on either side of an automobile tire, as illustrated in Fig. 1, the screw heads being on the outside so that no uneven projections come into contact with the tire. The fastener, after completion, is galvanized or coated with nickel or finished in any suitable manner. Instead of having the outer casing fit the hook member closely it is sometimes advantageous to have a close fit only at the pivoted end and to have the casing at the hook end slightly sprung apart as shown in Fig. 10 so that when the screw is loosened, the casing will tend to separate from the hook member and be more readily opened, since if the casing was continually pressed against the hook member by its own resiliency it might become rusted and opened with difficulty. This is avoided by the slight springing apart of the end of the casing as shown in Fig. 10, which is nevertheless drawn together when the screw is tightened and the fastener is locked in closed position. With the safety plate on the outer side of the casing, instead of on the inside, the slot 5ª is partly covered and protected, since when the screw is tightened, this side of the casing is clamped between the safety plate and the hook member. It will be understood that the form and proportions as well as the size and material of the fastener can be varied and that variations and modifications can be made in the specific embodiments of the invention illustrated and described without departing from the spirit and scope of the invention as set forth in the accompanying claims.

I claim:—

1. A safety fastener for chains comprising an inner hook member provided with a central threaded hole, an outer casing inclosing said hook member and having in one side a hole and in the other an open-sided slot adapted to aline with said threaded hole, a screw adapted to pass through said holes and slots to clamp the casing and hook member together, and means for preventing complete withdrawal of said screw from said threaded hole.

2. A safety fastener for chains comprising an inner hook member having a hook recess near one end, an outer casing inclosing said hook member and closing the side of said recess, said hook member and casing being pivotally mounted near one end with respect to each other, the hook member being provided with a central threaded hole and the casing with a hole in one side and an open sided slot in the other alining with the central threaded hole, a screw in said threaded hole adapted to clamp the casing and hook member in closed position, and means for preventing complete removal of the screw from said threaded hole.

3. A safety fastener for chains comprising an inner hook member and an outer casing pivotally mounted on a chain link at one end, said hook member being provided with a central threaded opening, and said casing being provided in one side with a hole and in the other with an open-sided slot adapted to aline with said threaded hole, and means for fastening said hook member and casing together comprising a screw adapted to pass through said holes and slot and having a reduced portion near its head and a safety plate pivoted upon said chain link and having an opening engaging the reduced portion of said screw to prevent complete withdrawal thereof from said threaded hole.

4. A safety fastener for chains comprising an inner hook member having a hook recess near one end, an outer casing inclosing said hook member and closing the side of said recess, said hook member and casing being pivotally mounted near one end with respect to each other, the hook member being provided with a central threaded hole and the casing with a hole in one side and an open sided slot in the other alining with the central threaded hole, a screw in said threaded hole adapted to clamp the casing and hook member in closed position, said screw having a reduced portion near its head, and a safety plate pivotally mounted with respect to said casing and having an opening engaging the reduced portion of said screw to prevent complete withdrawal thereof from said threaded hole.

In testimony whereof I affix my signature in the presence of two witnesses.

JACOB FAUS, Jr.

Witnesses:
JNO. MOSSMAN,
JEAN ALLISON.